US009262062B2

(12) United States Patent
Lee

(10) Patent No.: US 9,262,062 B2
(45) Date of Patent: Feb. 16, 2016

(54) METHOD OF PROVIDING THUMBNAIL IMAGE AND IMAGE PHOTOGRAPHING APPARATUS THEREOF

(75) Inventor: Mi-hyun Lee, Incheon (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 430 days.

(21) Appl. No.: 13/617,668

(22) Filed: Sep. 14, 2012

(65) Prior Publication Data

US 2013/0132901 A1    May 23, 2013

(30) Foreign Application Priority Data

Nov. 22, 2011 (KR) .......................... 10-2011-0122498

(51) Int. Cl.
*G06F 3/0484* (2013.01)
*G06F 3/0482* (2013.01)
*G06F 3/0346* (2013.01)

(52) U.S. Cl.
CPC .......... *G06F 3/04842* (2013.01); *G06F 3/0346* (2013.01); *G06F 3/0482* (2013.01)

(58) Field of Classification Search
CPC .. G06F 3/0482; G06F 3/04842; G06F 3/0346
USPC ........................................................ 715/811
See application file for complete search history.

(56) References Cited

U.S. PATENT DOCUMENTS

| 7,924,271 | B2* | 4/2011 | Christie et al. ................ 345/173 |
| 8,024,658 | B1* | 9/2011 | Fagans et al. ................. 715/730 |
| 8,245,143 | B2* | 8/2012 | Yach ..................... G06F 1/1626 |
| | | | 715/744 |
| 8,365,092 | B2* | 1/2013 | Lanahan et al. .............. 715/790 |
| 2009/0138825 | A1* | 5/2009 | Duarte ......................... 715/838 |
| 2012/0017154 | A1* | 1/2012 | Fagans et al. ................. 715/730 |
| 2012/0109776 | A1* | 5/2012 | Fagans et al. ................ 705/26.5 |
| 2013/0132901 | A1* | 5/2013 | Lee ........................ G06F 3/0482 |
| | | | 715/811 |
| 2013/0150165 | A1* | 6/2013 | Takahashi ............... A63F 13/06 |
| | | | 463/37 |
| 2013/0239063 | A1* | 9/2013 | Ubillos ................... H04L 51/24 |
| | | | 715/838 |

OTHER PUBLICATIONS

Apple, 2006, iPhoto 6 'Getting Started' Manual, pp. 1-36.*

* cited by examiner

*Primary Examiner* — David Phantana Angkool
(74) *Attorney, Agent, or Firm* — Staas & Halsey LLP

(57) ABSTRACT

A method of providing one or more thumbnail images and an image photographing apparatus thereof include displaying a plurality of thumbnail images corresponding respectively to a plurality of image data, if at least one of the plurality of thumbnail images is selected, changing a displaying status of the selected thumbnail image to be distinguishable from that of remaining thumbnail images and, if a user's motion is recognized, replacing the remaining thumbnail images with other thumbnail images while keeping the selected thumbnail image therein.

20 Claims, 10 Drawing Sheets

METHOD OF PROVIDING THUMBNAIL IMAGE AND IMAGE PHOTOGRAPHING APPARATUS THEREOF

CROSS-REFERENCE TO RELATED APPLICATIONS

This application claims the benefit of priority under 35 U.S.C. §119 from Korean Patent Application No. 10-2011-0122498 filed with the Korean Intellectual Property Office on Nov. 22, 2011, the disclosure of which is incorporated herein by reference in its entirety.

BACKGROUND

1. Field

The present general inventive concept relates to a method of providing one or more thumbnail images and an image photographing apparatus thereof and, more specifically, to a method of providing one or more thumbnail images corresponding to image data and an image photographing apparatus thereof.

2. Description of the Related Art

As image photographing apparatuses perform increasingly-sophisticated functions, the image photographing apparatuses require a larger storing space than ever before, and the kinds and number of image data are increased to be stored in the image photographing apparatuses.

In spite of the increased number of image data, it is inconvenient for a user to check every single image data in order to find one with good quality among the increased number of image data.

To solve this problem, a number of algorithm analyses may be used in the image photographing apparatus. However, an image photographing apparatus has a limitation in analyzing a good-quality image therein, since standards or criteria for determining a good-quality image may vary depending on a user preference.

Accordingly, a method to help a user select a good-quality image more easily and intuitively is needed.

SUMMARY

The present general inventive concept provides a method of providing one or more thumbnail images to help a user check thumbnail images corresponding to image data, edit the thumbnail images to further select a good-quality image more easily and conveniently and an image photographing apparatus thereof.

Additional aspects and advantages of the present general inventive concept will be set forth in part in the description which follows and, in part, will be obvious from the description, or may be learned by practice of the general inventive concept.

The foregoing and/or other features and utilities of the present general inventive concept may be achieved by providing a method of providing one or more thumbnail images by an image photographing apparatus thereof which may include displaying a plurality of thumbnail images corresponding respectively to a plurality of image data, if at least one of the plurality of thumbnail images is selected, changing a displaying status of the selected thumbnail image to be distinguishable from that of remaining thumbnail images and if a user's motion is recognized, replacing the remaining thumbnail images with other thumbnail images while keeping the selected thumbnail images intact.

The user's motion may be a motion of shaking the image photographing apparatus at least once.

If there are consecutively-photographed image data among the plurality of image data, the displaying the plurality of thumbnail images may include displaying one of the consecutively-photographed image data as a thumbnail image.

The displaying the plurality of thumbnail images may include displaying thumbnail images corresponding respectively to the plurality of image data, except for image data having a hand-shake above a predetermined level.

The method may further include, if an order to store the selected thumbnail image is input, storing image data corresponding to the selected thumbnail image at a user-selected area and removing the selected thumbnail image from a display screen.

The method may further include, if the selected thumbnail image is removed, displaying another thumbnail image at which the selected image was located.

The method may further include extracting a category of an image data corresponding to the selected thumbnail image and determining a user-preferred category based on the category of the extracted image data, and the replacing may include replacing remaining thumbnail images except for the selected thumbnail image with thumbnail images corresponding to the user-preferred category.

The replacing comprises choosing and replacing with the other thumbnail images by placing additional weight on at least one of a degree of hand-shake, brightness or usage frequency.

The changing may include distinguishing the selected thumbnail image from the remaining thumbnail images by marking a certain item along the selected thumbnail image or highlighting the selected thumbnail image.

The foregoing and/or other features and utilities of the present general inventive concept may also be achieved by providing an image photographing apparatus which may include a photographing unit, a display unit to display a plurality of thumbnail images corresponding respectively to a plurality of image data, a user motion recognizing unit to recognize a user's motion, and a control unit, if at least one of the plurality of thumbnail images is selected, changing a display status of the selected thumbnail image to be distinguishable from that of remaining thumbnail images and, if a user's motion is recognized through the user motion recognizing unit, to replace the remaining thumbnail images with other thumbnail images.

The user's motion may include a motion of shaking the image photographing apparatus at least once.

When there are consecutively-photographed image data among the plurality of image data, the control unit may control the display unit to display a thumbnail image corresponding to one of the consecutively-photographed image data as the thumbnail image.

The control unit may control the display unit to display thumbnail images corresponding respectively to the plurality of image data, except for image data having a hand-shake above a predetermined level.

The apparatus may further include a storage unit, and the control unit may store image data corresponding to the selected thumbnail image at a user-selected area if a signal to store the selected thumbnail image is input and control the display unit to remove the selected thumbnail image from a display screen of the plurality of thumbnail images.

The control unit may control the display unit to display another thumbnail image at which the selected thumbnail image was located when the selected thumbnail image is removed.

The control unit may extract a category of an image data corresponding to the selected thumbnail image, determine a user-preferred category based on the extracted category of the image data and replace the remaining thumbnail images with thumbnail images corresponding to the user-preferred category.

The control unit may choose and replace with the another thumbnail image by placing additional weight on at least one of a degree of hand-shake, brightness or usage frequency.

The control unit may distinguish the selected thumbnail image from the remaining thumbnail images by marking a certain item along the selected thumbnail image or highlighting the selected thumbnail image.

The foregoing and/or other features and utilities of the present general inventive concept may also be achieved by providing a method of providing thumbnail image by an image photographing apparatus, the method including displaying a plurality of thumbnail images corresponding respectively to a plurality of image data, selecting at least one of the plurality of thumbnail images according to a user's input and, if a user's motion is recognized, storing an image data corresponding to the selected thumbnail image and changing the displayed plurality of thumbnail images into other thumbnail images.

The foregoing and/or other features and utilities of the present general inventive concept may also be achieved by providing an image photographing apparatus which may include a photographing unit, a display unit to display a plurality of thumbnail images corresponding respectively to a plurality of image data, a use motion recognizing unit, and a control unit, if at least one of the plurality of thumbnail images is input according to a user's input, to store an image data corresponding to the selected thumbnail image and to replace the displayed plurality of thumbnail images.

The foregoing and/or other features and utilities of the present general inventive concept may also be achieved by providing a method of providing one or more thumbnail images in an image photographing apparatus, the method including selecting and displaying one or more thumbnail images corresponding to image data according to a predetermined condition, and modifying at least one of the displayed thumbnail images according to a predetermined motion of the image photographing apparatus.

The foregoing and/or other features and utilities of the present general inventive concept may also be achieved by providing a non-transitory computer-readable medium to contain computer-readable codes as program to execute a method of providing one or more thumbnail images in an image photographing apparatus, the method including selecting and displaying one or more thumbnail images corresponding to image data according to a predetermined condition, and modifying at least one of the displayed thumbnail images according to a predetermined motion of the image photographing apparatus.

The foregoing and/or other features and utilities of the present general inventive concept may also be achieved by providing an image photographing apparatus including a photographing unit to perform a photographing operation to correspond to image data, a display unit to display one or more thumbnail images, and a control unit to select the image data according to a predetermined condition to generate the one or more thumbnail images corresponding to the selected image data, and to modify at least one of the displayed thumbnail images according to a predetermined motion of the image photographing apparatus.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE EMBODIMENTS

Figure 1:
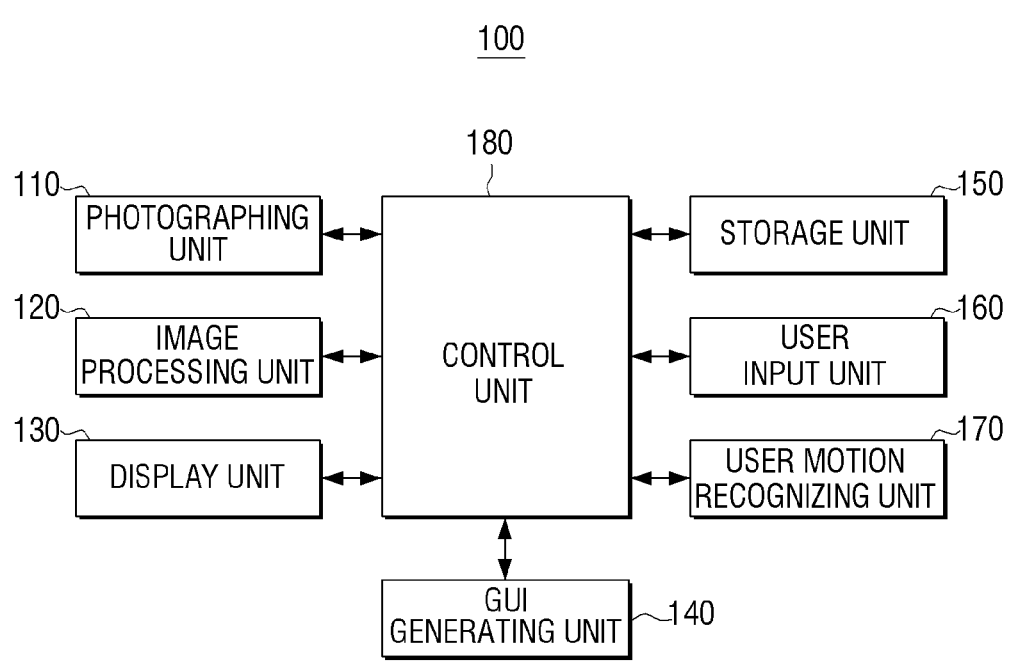
FIG. 1 is a block diagram illustrating an image photographing apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 illustrates an image photographing apparatus according to an exemplary embodiment of the present general inventive concept. As illustrated in FIG. 1, the image photographing apparatus 100 includes a photographing unit 110, an image processing unit 120, a display unit 130, a graphic user interface (GUI) generating unit 140, a storage unit 150, a user input unit 160, a user motion recognizing unit 170 and a control unit 180. Herein, the image photographing apparatus 100 according to an exemplary embodiment may be a digital camera, but it is not limited and may be realized as a mobile phone, a PDA, a tablet computer apparatus, a camcorder and the like, which have a photographing unit.

The photographing unit 110 may include a shutter, a lens unit, a diaphragm, an image sensor, for example a charge coupled device (CCD) image sensor, and an analog/digital converter (ADC), which are not illustrated. A shutter is a device to modulate an amount of exposed light along with a diaphragm. The lens unit may have one or more lenses to process light received from an external light source. Herein, the diaphragm modulates an amount of light (flux of light) according to its degree of openness. The CCD image sensor accumulates flux of light received from the lens unit and outputs an image, photographed by the lens unit according to the flux of light, corresponding to a vertical sync signal. The image photographing apparatus 100 obtains an image by the CCD image sensor which converts light reflected from a subject into an electric signal. In order to obtain a color image by the CCD image sensor, a color filter may be needed, and a color filter array (CFA) may be used. The CFA is configured such that every pixel passes light having a corresponding color and is arranged orderly, and forms of CFAs may vary depending on how pixels are arranged. The ADC converts an analog image signal output from the CCD image sensor into a digital signal.

Meanwhile, the above-described method of photographing by the photographing unit 110 is merely exemplary, and other methods of photographing may be used. For example, instead of the CCD image sensor, a complementary metal oxide semiconductor (CMOS image sensor may be used to photograph an image in the photographing unit 110.

The image processing unit 120 performs signal-processing on raw data of the control unit 180 corresponding to the digital signal to display the processed data. The image processing unit 120 removes a black level caused by a dark current which is generated in a temperature-sensitive CCD image sensor and a CFA filter. The image processing unit 120 performs a gamma correction which is to encode information according to non-linear visions of human beings. The image processing unit 120 performs a color filter array (CFA) interpolation to interpolate a certain RGRG line having the processed gamma correction or a Bayer pattern realized as a GBGB line into a RGB line. The image processing unit 120 converts the interpolated RGB signal into Y, U and V signals, performs an edge compensation to make an image clearer by filtering a Y signal through a high-pass filter and carries out a color correction to correct color values of U and Y signals while removing noises thereof. The image processing unit 120 generates a file with a format, for example, a JPEG file by performing compression and signal-processing on Y, U and V signals with noises removed, displays the generated JPEG file in the display unit 130 and store the generated JPEG file in the storage unit 150.

Meanwhile, the above-method of processing an image by the image processing unit 120 is merely exemplary, and other methods may be used.

The display unit 130 displays the image data processed in the image processing unit 120 or stored in the storage unit 150. In addition, the display unit 130 displays a graphic user interface (GUI) generated by the GUI generating unit 140. The display unit 130 may display a list of one or more thumbnail images including a plurality of thumbnail images corresponding to respective ones of a plurality of image data under the control of the control unit 180.

The GUI generating unit 140 generates a GUI in the form of OSD (On Screen Display) under the control of the control unit 180.

The storage unit 150 stores programs and data to drive the image photographing apparatus 100 and stores the image data processed in the image processing unit 120.

The user input unit 160 receives an input (command) signal from a user. Herein, the user input unit 160 may be realized as a shutter, a button, an icon, and a touch screen, which are placed an external portion of the image photographing apparatus 100. The user input unit 160 and the display unit may 130 may be formed as a single unit formed, for example, a touch panel to display an image corresponding to the image data and to receive the user input signal.

The user motion recognizing unit 170 recognizes a user's motion using the image photographing apparatus 100. Herein, the user's motion may be motions of shaking the image photographing apparatus 100, rotating the image photographing apparatus 100 with respect to a reference, for example, in a clockwise or counterclockwise direction, or shaking a user's hand on the display unit 130. The user motion recognizing unit 170 may be realized as a camera, a Gyroscope sensor and an accelerometer sensor, but it is not limited thereto.

The control unit 180 controls overall operations of the image photographing apparatus 100. The control unit 180 may control overall operations of the image photographing apparatus 100 according to a user's input signal through the user input unit 160 and a motion of the user motion recognizing unit 170. When at least one thumbnail image is selected from a list of thumbnail images including a plurality of thumbnail images through the user input unit 160, the control unit 180 changes a display status of the selected thumbnail image to be distinguishable from remaining thumbnail images. If a user's motion is recognized through the user motion recognizing unit 170 regarding an image, the control unit 180 replaces unselected remaining thumbnail images with other thumbnail images while keeping the selected thumbnail image on the list of thumbnail images.

Hereinafter, FIGS. 2 to 6 illustrate a method of selecting and storing an image according to a user preference by using thumbnail images.

Figure 2:
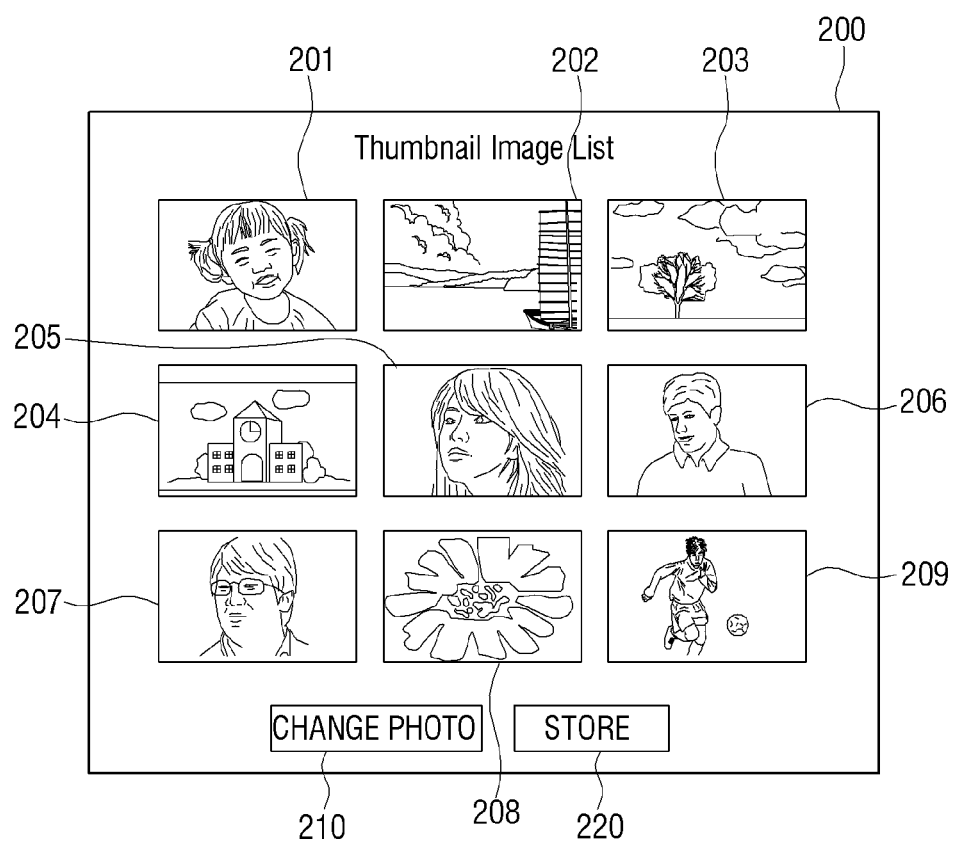
FIGS. 2 to 6 are views illustrating a method of selecting image data using thumbnail images according to an exemplary embodiment of the present general inventive concept.

If a signal to generate a list of thumbnail images is input through the user input unit 160, the control unit 180 controls the display unit 130 to display a screen corresponding to a list of thumbnail images 200 including a plurality of thumbnail images 201 to 209 as illustrated in FIG. 2. Herein, the list of thumbnail images 200 may include one or more icons to control or process the list of the thumbnail images 200, for example, a photo change icon 210 and a storage icon 220.

Herein, if there is a plurality of consecutively-photographed image data among image data stored in the storage unit 150, the control unit 180 includes only thumbnail images corresponding to a predetermine number of image data, for example, one or two image data, among a plurality of consecutively-photographed image data to a list of thumbnail images. The present general inventive concept is not limited thereto. It is possible that only one image can be selected from the consecutively-photographed image data, it is also possible that more than two images can be selected from the consecutively-photographed image data. Accordingly, a user does not need to check out the pictures or images taken by the photographing unit 110 or stored in the storage unit 150.

For example, when the images corresponding to the image data taken by the photographing unit 110 or stored in the storage unit 150 may include a first group of consecutively-photographed images, a second group of individually-photographed images which are not consecutively-photographing images, and a third group of consecutively-photographing images, the controller controls the storage unit 150 and the display unit 130 to display the thumbnail image list including one or two images selected from the first group, images of the second group, and images selected from the third group. The number of the displayed images of the first group may be smaller than the number of the images of the first group.

It is possible that a number of the individually-photographed images of the second group may be selected from the images of the second group according to a preference set by a user, similarity between the images, a predetermined light level of black, white or a color, or a predetermined condition set by a user or a program stored in the storage unit and controlled by the control unit 180 according to the input to generate the thumbnail image list 200.

It is also possible that images of the groups may be excluded and are not included in the thumbnail image list 200 according to a condition or preference. That is, images meeting the condition and preference are selected from the groups, and the selected images are not included in the thumbnail image list. It is also possible that images of the groups can be selected according to priorities given to the images and/or groups, and the selected images can be included in the thumbnail list 200 according to the given priority. It is also possible that the priorities can be given to the preferences or conditions. When the images are selected, images having a high priority can be selected compared to images having a low priority.

The thumbnail image list 200 may be created when all images of the image data have been photographed and stored in the storage unit. It is also possible that the thumbnail image list 200 may be created during photographing by the photographing unit 110. In this case, the number of the thumbnail images of the thumbnail image list 200 may increase according to a photographing time since a new thumbnail image is added to the thumbnail image list 200 according to the preference and condition.

It is possible that the number of thumbnail images to be included in the thumbnail image list 200 may be set or variable according to a size of a screen of the display unit 130 or a user preference, for example. The thumbnail image list 200 may be a single page. However, it is possible that the thumbnail image list 200 may include two or more pages. FIG. 2 illustrates a page of the thumbnail image list 200, for example, The control unit 180 includes only thumbnail images corresponding to a plurality of image data, except for image data having a hand-shake level above a predetermined level, to a list of thumbnail images. The control unit 180 analyzes pixels among a plurality of image data and prevents thumbnail images corresponding to image data having a certain pixel (ex. a white or black pixel) more than a predetermined number from being included to a list of thumbnail images. It is intended to avoid adding image data having a high hand-shake level or image data having a high bright or dark level to a list of thumbnail images.

Figure 3:
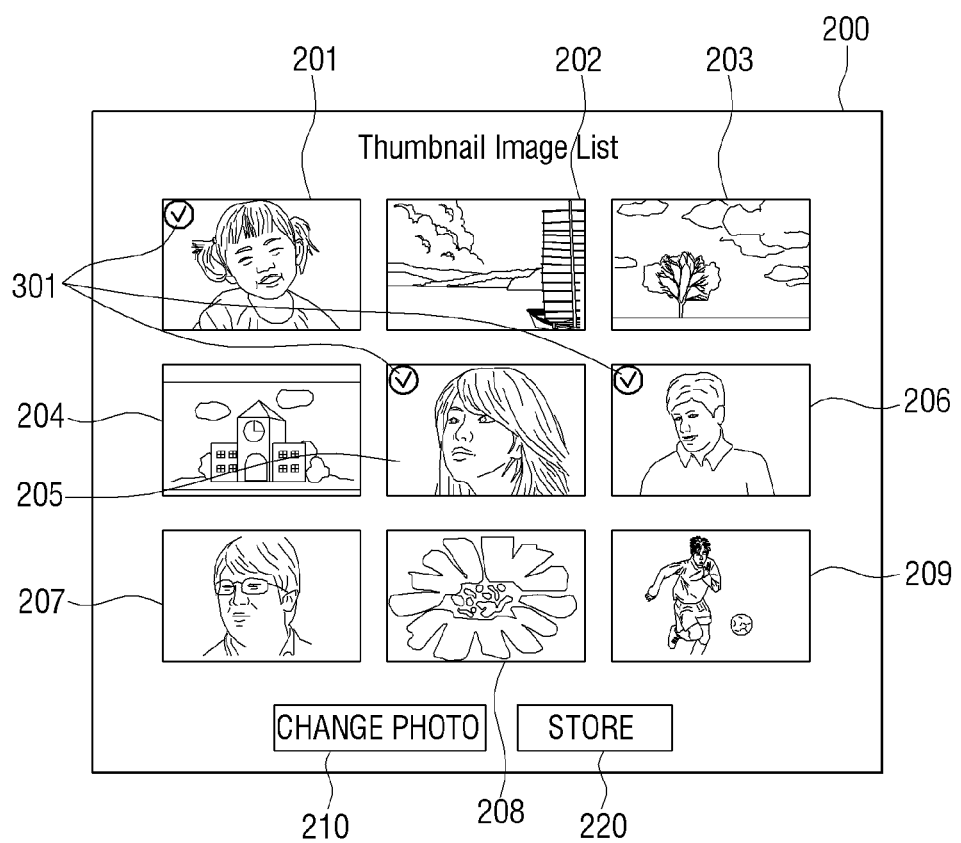

When at least one thumbnail image among a plurality of thumbnail images included to a list of thumbnail images is selected, the control unit 180 displays the selected thumbnail image to be distinguishable from unselected remaining thumbnail images (Hereinafter, referred to as "remaining thumbnail images"). When a first thumbnail image 201, a fifth thumbnail image 205 and a sixth thumbnail image 206 of FIG. 2 are selected through the user input unit 160, the control unit 180 may generate a mark, for example, an icon 301 along the thumbnail image to further distinguish the first thumbnail image 201, the fifth thumbnail image 205 and the sixth thumbnail image 206 from the remaining thumbnail images as illustrated in FIG. 3.

However, distinguishing the selected thumbnail image from the remaining thumbnail images by marking an icon along the selected image is merely exemplary, and other methods may be usable to distinguish a selected thumbnail image from remaining thumbnail images may be used. For example, the control unit 180 may highlight the selected thumbnail image to distinguish it from remaining thumbnail images. It is also possible that the selected thumbnail image can be enlarged compared to the remaining thumbnail image or can be displayed with a bold frame, for example.

If a predetermined motion, for example, a user's motion (ex. a motion of shaking the image photographing apparatus 100 at least once) is recognized through the user motion recognizing unit 170 with at least one thumbnail image selected, the control unit 180 may replace remaining thumbnail images with other (or new) thumbnail images while keeping the selected thumbnail image in the list of thumbnail images 200. Herein, the other (new) thumbnail images may be thumbnail images not displayed on a current list of thumbnail images corresponding to image data stored in the storage unit 150 of the image photographing apparatus 100.

The other (new) thumbnail images may be thumbnail images of images previously stored in the storage unit 150 when the thumbnail image list is generated or displayed or may be thumbnail images of images currently photographed by the photographing unit 110, processed by the image processing unit 120, and stored in the storage unit 150. It is possible that other (new) thumbnail images may be thumbnail images of images photographed after the thumbnail image list is generated or displayed.

When a predetermined motion, for example, a motion of shaking the image photographing apparatus 100 occur, are detected, or are determined through the user motion recognizing unit 170 when the first thumbnail image 201, the fifth thumbnail image 205 and the sixth thumbnail image 206 are selected, the control unit 180 may replace remaining thumbnail images 202, 203, 204, 207, 208, 209 with other (new) thumbnail images 402, 403, 404, 407, 408, 409, except for the selected thumbnail images 201, 205, 206, as illustrated in FIG. 3. Since the above-described motion of shaking the image photographing apparatus 100 is merely exemplary, other motions (ex. motions of rotating the image photographing apparatus or shaking a user's hand on the display unit 130 may be included in the shaking motion. The predetermined motion may be repeated motions of a predetermined pattern, opposite direction motions, consecutive motions, etc.

Figure 4:
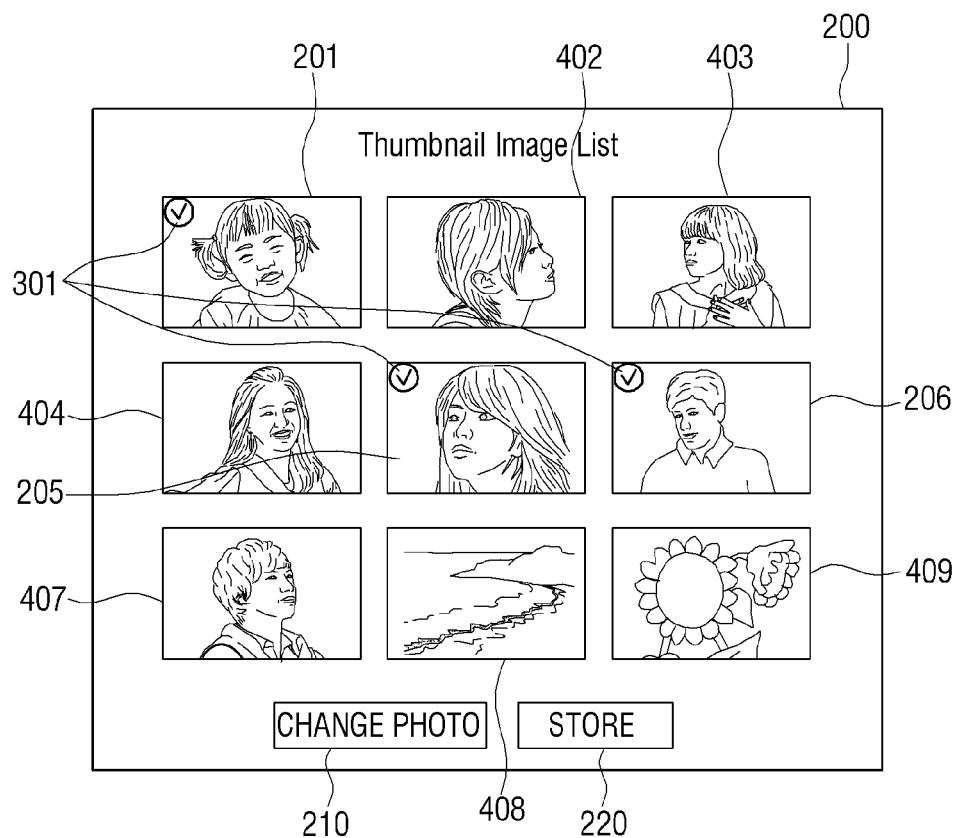

Referring to FIG. 4, when the photo change icon 210 included in the list of thumbnail images is selected through the user input unit 160, the control unit 180 may replace the remaining thumbnail images 202, 203, 204, 207, 208, 209 with other thumbnail images 402, 403, 404, 407, 408, 409, except for the selected thumbnail images 201, 205, 206.

When the remaining thumbnail images are replaced by other thumbnail images, the control unit 180 may choose and replace with other thumbnail images by placing an additional weight on at least one of a degree of hand-shake, brightness or usage frequency of image data. For instance, other thumbnail images may be chosen by placing a less weight on an image which have a high hand-shake level or a too-bright or too-dark level image. The control unit 180 may choose other thumbnail images by placing a more weight on an image according to a user preference or according to a user previous usage.

The control unit 180 may replace the remaining thumbnail images with other thumbnail images by analyzing information of image data corresponding to the selected thumbnail image. The control unit 180 analyzes information of image data corresponding to the selected thumbnail image, extracts a category of the selected thumbnail image, and determines a user preference, for example, a user-preferred category, by using the extracted category of the image data. The control unit 180 may analyze information (e.g., pixels) of image data corresponding to the selected thumbnail image and determines a category of image data corresponding to the selected thumbnail image. Herein, categories may include scenery, person, night scene, and macro photography.

The control unit 180 analyzes the category of the selected thumbnail image and determines a user-preferred category. The control unit 180 may replace the remaining thumbnail images with other thumbnail images according to the user-preferred category. For instance, if sceneries turn out to be the most selected images after analyzing a category of thumbnail images selected by a user, the control unit 180 may replace the remaining thumbnail images with thumbnail images corresponding to scenery images.

Accordingly, the image photographing may analyze a user-preferred category on its own and provide thumbnail images to a user.

If a plurality of thumbnail images are selected and a signal to store a plurality of thumbnail images is input by repeating the operations illustrated FIGS. 3 and 4, the control unit 180 stores image data corresponding to the selected thumbnail image at a user-selected area and removes the selected thumbnail image from a display screen.

Figure 5:
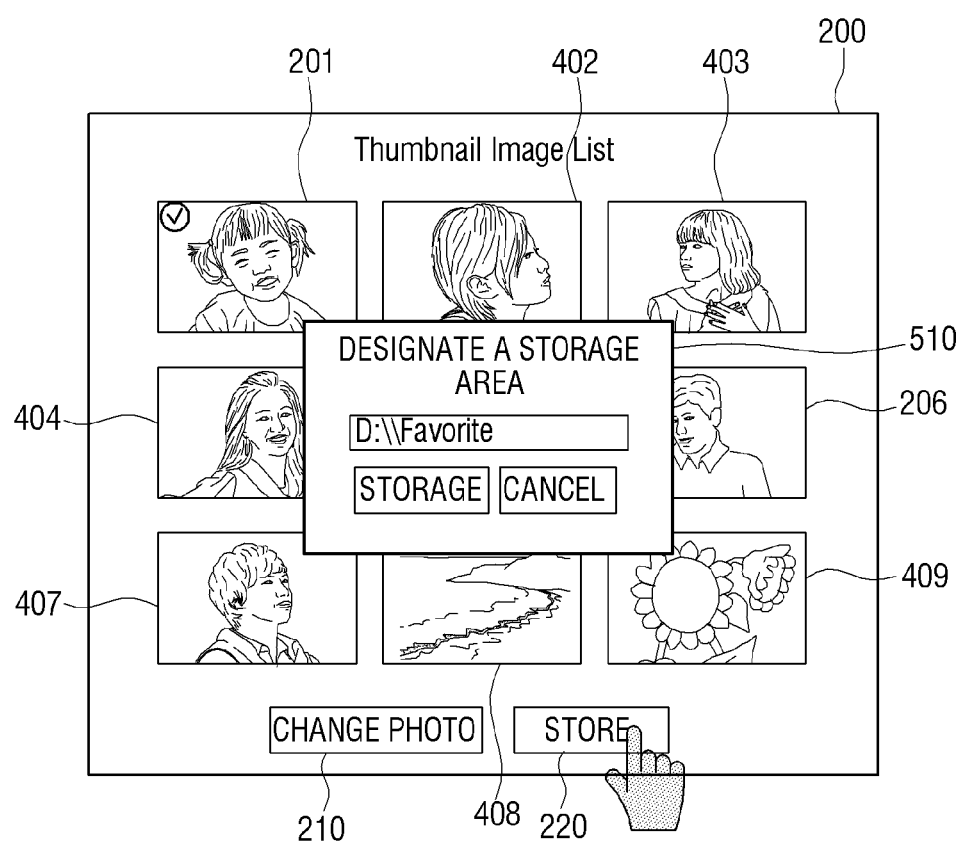
Figure 6:
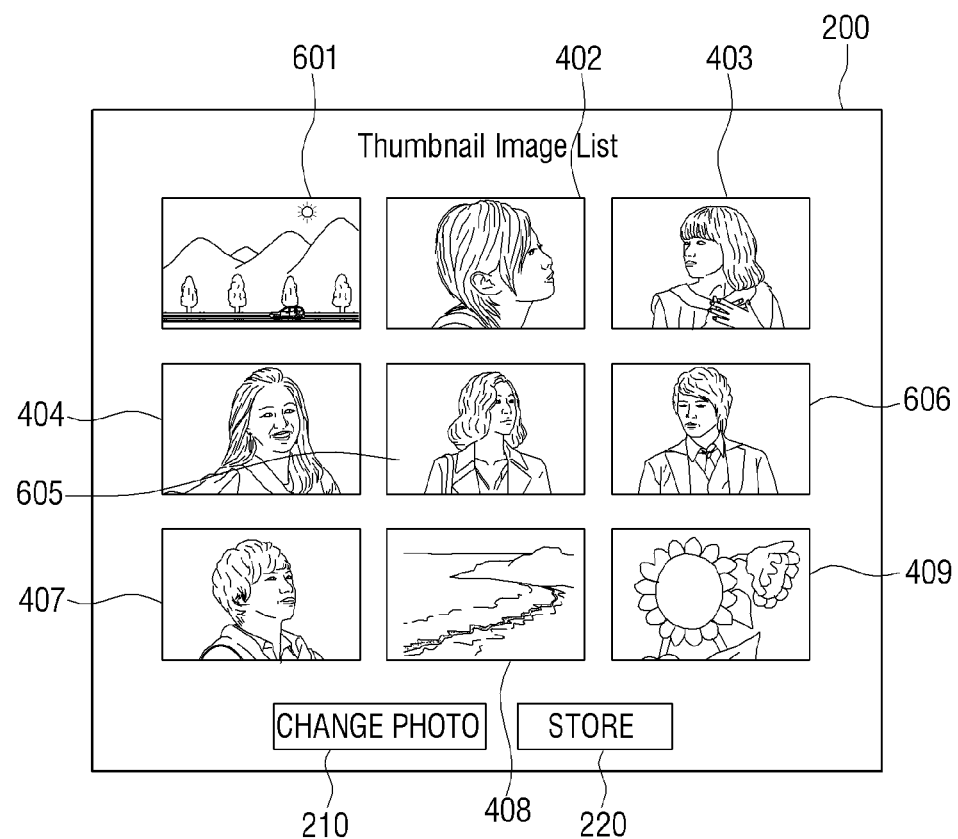

Referring to FIG. 5, when the storage icon 220 included in the list of thumbnail images 200 is selected through the user input unit 160, the control unit 180 displays a storage menu 510 to store image data corresponding to thumbnail images at a user-selected area. Herein, the storage menu 510 includes a menu to designate where image data corresponding to the selected thumbnail image is stored, and to select a storage button to continue a storing operation or a cancel button to cancel the storing operation.

If a storage area is selected by the storage menu 510 illustrated FIG. 5, the control unit 180 stores image data corresponding to the selected images 201, 205, 206 at the selected storage area and removes the selected thumbnail images from the list of thumbnail image list 200. And then the control unit 180 displays new thumbnail images 601, 605, 606 at which the selected images were displayed.

With the above-described image photographing apparatus 100, a user may search and select an image which the user intends or prefers, more easily and intuitively.

Figure 7:
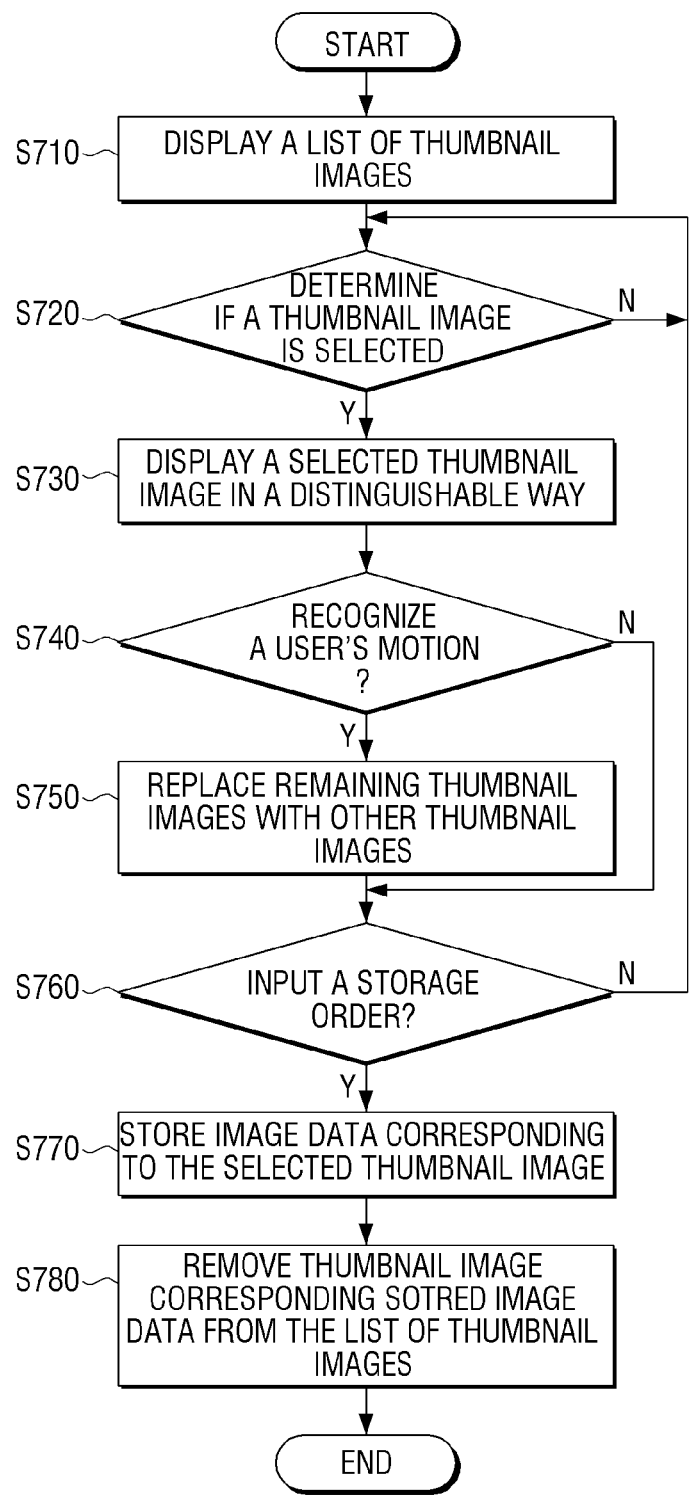
FIG. 7 is a flowchart illustrating a method for providing one or more thumbnail images according to an exemplary embodiment of the present general inventive concept.

Hereinafter, FIG. 7 illustrates a method of providing thumbnail image of an image photographing apparatus according to an exemplary embodiment.

At operation S710, an image photographing apparatus 100 displays a list of thumbnail images according to a user's input or command. Herein, the list of thumbnail images includes a plurality of thumbnail images corresponding to a plurality of image data.

The image photographing apparatus 100 determines if a thumbnail image is selected according to the user's input at operation S720.

If a thumbnail image is selected at operation S720-Y, the image photographing apparatus 100 displays the selected thumbnail image to be distinguishable from remaining thumbnail images. For instance, the image photographing apparatus 100 may display the selected thumbnail image by marking an icon along the selected thumbnail image or highlighting the selected thumbnail image.

If the thumbnail image is selected, the image photographing apparatus 100 recognizes a user's motion at operation S740. Herein, a user's motion may be a motion of shaking the image photographing apparatus 100 at least once, but it is not limited.

If a user's motion is recognized at operation S740-Y, the image photographing apparatus 100 replaces the remaining thumbnail images with other thumbnail images at operation S750. Herein, the image photographing apparatus 100 may choose other thumbnail images in consideration of a degree of hand-shake, brightness, usage frequency and a user-preferred category.

The image photographing apparatus 100 determines if an order to store image data corresponding to the selected thumbnail image is input at operation S760.

If the storage order (button) is selected and input at operation S760-Y, the image photographing apparatus 100 stores image data corresponding to the selected thumbnail image at operation S770. Herein, the image photographing apparatus 100 may store image data corresponding to the selected thumbnail image at a user-selected area.

The image photographing apparatus 100 removes a thumbnail image corresponding to the stored image data from the list of thumbnail images at operation S780.

Herein, the image photographing apparatus 100 may display a new thumbnail image at which the removed thumbnail image was located.

With the above-described method of providing thumbnail image, a user may search and select an image more easily and intuitively.

Figure 8:
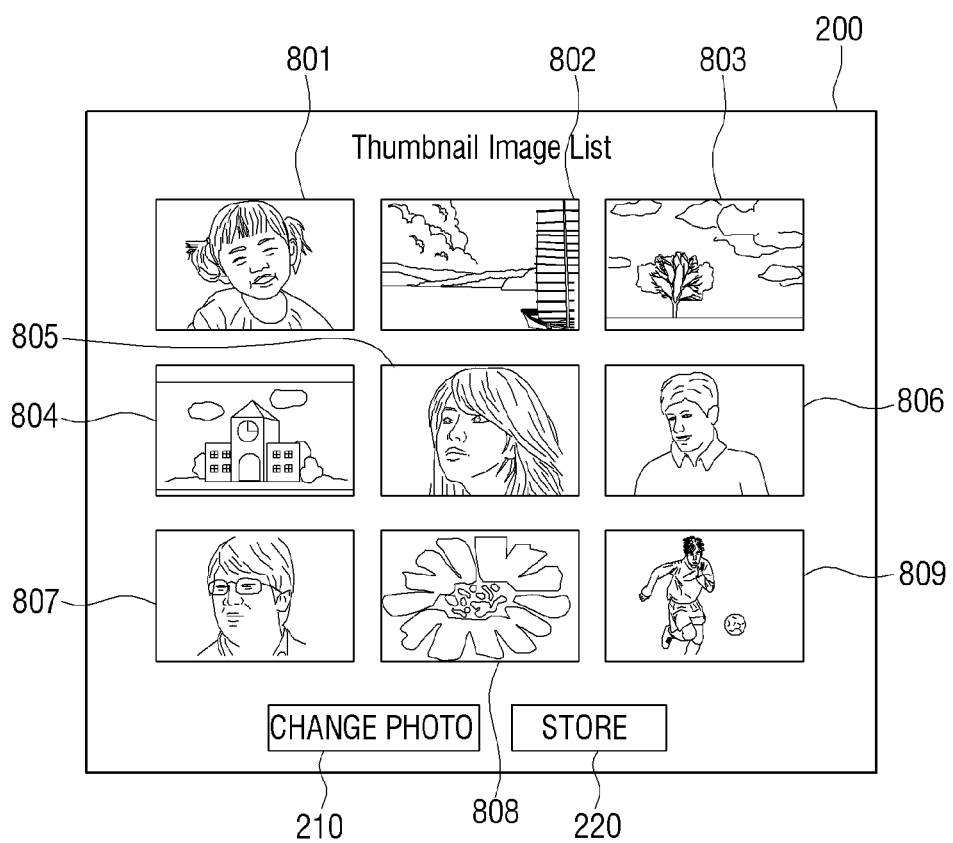
FIGS. 8 to 10 are views illustrating a method of storing image data using one or more thumbnail images according to an exemplary embodiment of the present general inventive concept.
Figure 9:
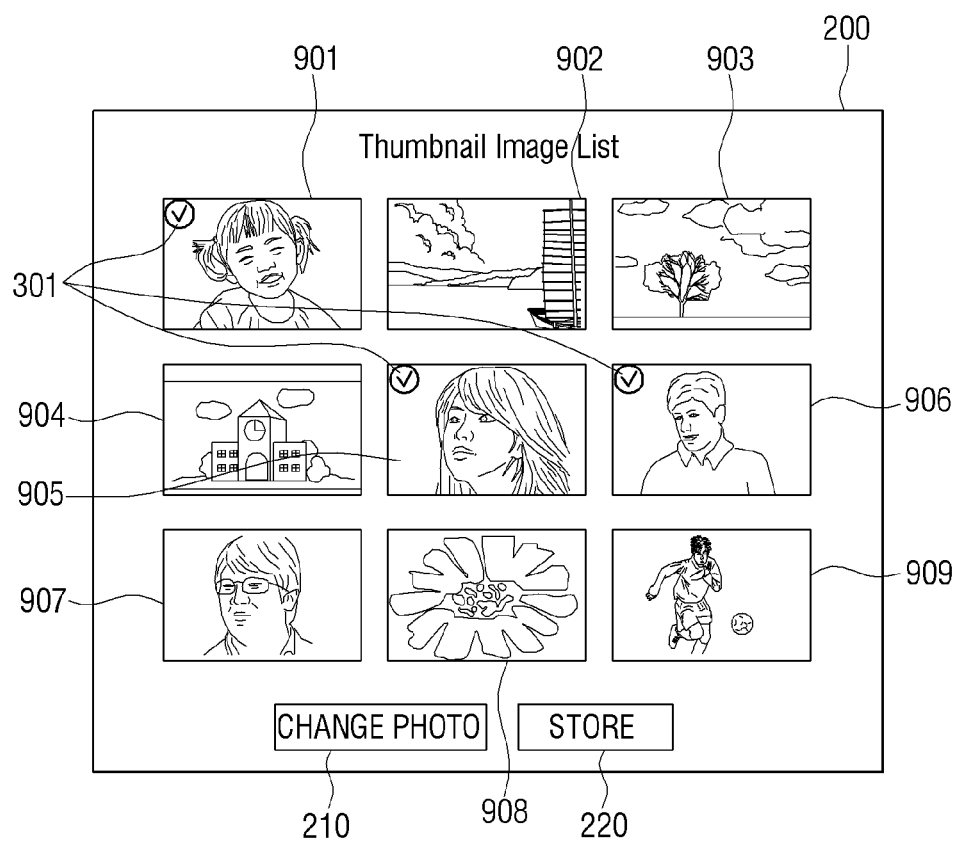
Figure 10:
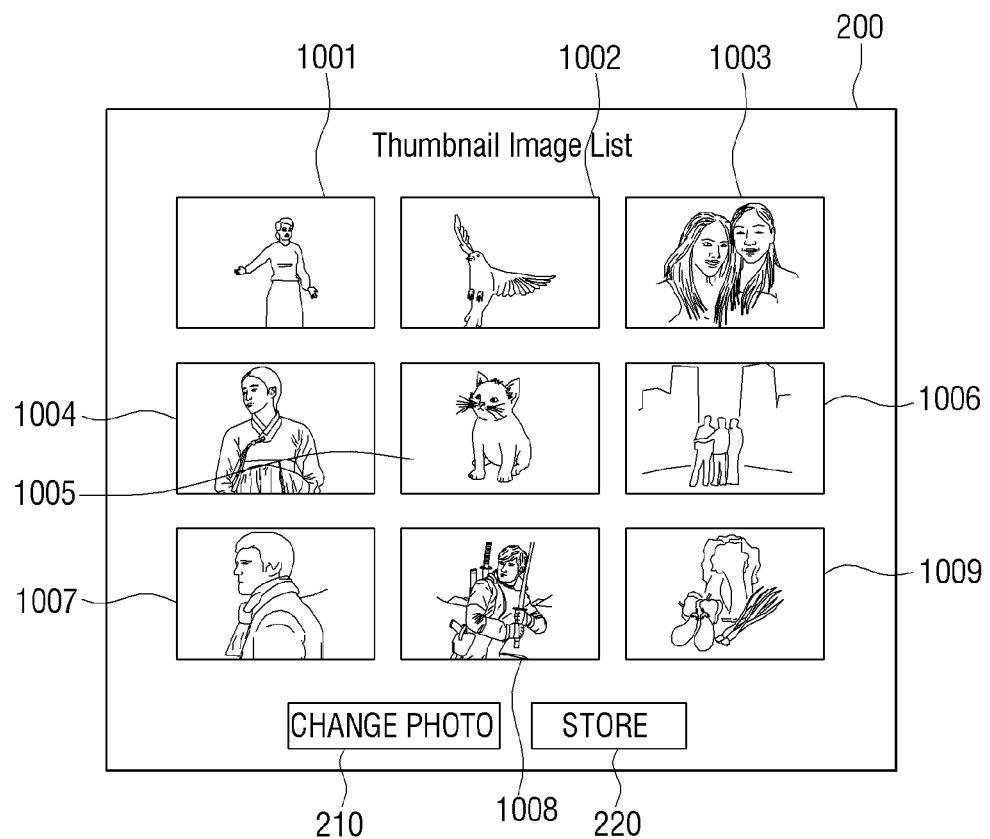

Hereinafter, FIGS. 8 to 10 provide a list of thumbnail image 200 to be displayed in the image photographing apparatus of FIG. 1 according to an exemplary embodiment of the present general inventive concept.

The control unit 180 generates a list of thumbnail images 200 including a plurality of thumbnail images 801 to 809 corresponding to a plurality of image data.

When a first thumbnail image 801, a fifth thumbnail image 805 and a sixth thumbnail image 806 of FIG. 8 are selected through the user input unit 160, the control unit 180 may display an icon 901 along the thumbnail image as illustrated in FIG. 9 to further distinguish the selected first thumbnail image 801, the selected fifth thumbnail image 805 and the selected sixth thumbnail image 806 from other thumbnail images.

When a predetermined motion, for example, a user's motion (e.g., a motion of shaking the image photographing apparatus 100 at least once) is input through the user motion recognizing unit 170, the control unit 180 stores the selected thumbnail image at a predetermined area (e.g., a user-selected area) and replaces all of the selected thumbnail images 801 to 809 with other thumbnail images 1001 to 1009 as illustrated FIG. 10.

Accordingly, a user may store image data corresponding to the selected thumbnail image at a predetermined area only by using a simple motion.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), a flash memory, an EPROM (Erasable Programmable ROM), an EEOPROM (Electronically Erasable and Programmable ROM), CD-ROMs, magnetic tapes, floppy disks, and optical data storage devices, or a detachably attached to a computer apparatus. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of providing one or more thumbnail images in an image photographing apparatus, the method comprising:
   displaying a plurality of thumbnail images corresponding respectively to a plurality of image data;
   when at least one thumbnail image of the plurality of thumbnail images is selected, changing a displaying status of the selected thumbnail image to be distinguishable from that of remaining thumbnail images; and
   when a motion of a user is recognized, replacing a non-selected thumbnail image of the displayed plurality of thumbnail images with another thumbnail image that was not included in the displayed plurality of thumbnail images while continuing to display the selected at least one thumbnail image therein.

2. The method of claim 1, wherein the motion of the user comprises one or more of a motion of shaking the image photographing apparatus at least once, a motion of rotating the image photographing apparatus with respect to a reference in one or more of a clockwise or counterclockwise direction, and a motion of shaking a hand of the user on the display unit.

3. The method of claim 1, wherein, if there are consecutively-photographed image data among the plurality of image data, the displaying the plurality of thumbnail images comprises displaying one of the consecutively-photographed image data as the thumbnail image.

4. The method of claim 1, wherein the displaying the plurality of thumbnail images comprises displaying thumbnail images corresponding respectively to the plurality of image data, except for image data having a hand-shake above a predetermined level.

5. The method of claim 1, further comprising:
if an order to store the selected thumbnail image is input, storing image data corresponding to the selected thumbnail image at a user-selected area and removing the selected thumbnail image from a display screen of the displayed thumbnail images.

6. The method of claim 5, further comprising:
if the selected thumbnail image is removed, displaying another thumbnail image at which the selected image was located.

7. The method of claim 1, further comprising;
extracting a category of an image data corresponding to the selected thumbnail image; and
determining a user-preferred category based on the category of the extracted image data;
wherein the replacing comprises replacing remaining thumbnail images except for the selected thumbnail image with thumbnail images corresponding to the user-preferred category.

8. The method of claim 1, wherein the replacing comprises choosing and replacing with the other thumbnail images by placing additional weight on at least one of a degree of hand-shake, brightness or usage frequency.

9. The method of claim 1, wherein the changing comprises distinguishing the selected thumbnail image from the remaining thumbnail images by marking a certain item along the selected thumbnail image or highlighting the selected thumbnail image.

10. An image photographing apparatus, comprising:
a photographing unit;
a display unit to display a plurality of thumbnail images corresponding respectively to a plurality of image data generated according to a photographing operation of the photographing unit;
a user motion recognizing unit to recognize a user's motion; and
a control unit, if at least one thumbnail image of the displayed plurality of thumbnail images is selected, to replace a non-selected thumbnail image of the displayed plurality of thumbnail images with another thumbnail image that was not included in the displayed plurality of thumbnail images while continuing to display the selected at least one thumbnail image based on the motion of the user recognized by the user motion recognizing unit.

11. The apparatus of claim 10, wherein the user's motion comprises a motion of shaking the image photographing apparatus at least once.

12. The apparatus of claim 10, wherein, if there are consecutively-photographed image data among the plurality of image data, the control unit controls the display unit to display a thumbnail image corresponding to one of the consecutively-photographed image data.

13. The apparatus of claim 10, wherein the control unit controls the display unit to display thumbnail images corresponding respectively to the plurality of image data, except for image data having a hand-shake above a predetermined level.

14. The apparatus of claim 10, further comprising:
a storage unit;
wherein the control unit stores image data corresponding to the selected thumbnail image at a user-selected area if an order to store the selected thumbnail image is input and controls the display unit to remove the selected thumbnail image from a display screen.

15. The apparatus of claim 14, wherein the control unit controls the display unit to display another thumbnail image at which the selected thumbnail image was located when the selected thumbnail image is removed.

16. The apparatus of claim 10, wherein the control unit extracts a category of an image data corresponding to the selected thumbnail image, determines a user-preferred category based on the extracted category of the image data and replaces the remaining thumbnail images with thumbnail images corresponding to the user-preferred category.

17. The apparatus of claim 10, wherein the control unit chooses and replaces with the another thumbnail image by placing additional weight on at least one of a degree of hand-shake, brightness or usage frequency.

18. The apparatus of claim 10, wherein the control unit distinguishes the selected thumbnail image from the remaining thumbnail images by marking a certain item along the selected thumbnail image or highlighting the selected thumbnail image.

19. A method of providing thumbnail image in an image photographing apparatus, the method comprising:
displaying a plurality of thumbnail images corresponding respectively to a plurality of image data;
selecting at least one thumbnail image of the plurality of thumbnail images according to an input of a user; and
if a motion of the user is recognized, storing the image data corresponding to the selected thumbnail image and replacing a non-selected thumbnail image of the displayed plurality of thumbnail images with another thumbnail image that was not included in the displayed plurality of thumbnail images while continuing to display the selected at least one thumb nail image.

20. An image photographing apparatus, comprising:
a photographing unit;
a display unit to display a plurality of thumbnail images corresponding respectively to a plurality of image data generated according to a photographing operation of the photographing unit;
a user motion recognizing unit to recognize a predetermined user motion; and
a control unit, if at least one thumbnail image of the plurality of thumbnail images is input according to an input of a user, to store the image data corresponding to the selected thumbnail image and to replace a non-selected thumbnail image of the displayed plurality of thumbnail images with another thumbnail image that was not included in the displayed plurality of thumbnail images while continuing to display the selected at least one thumb nail image according to the predetermined user motion recognized by the user motion recognizing unit.

* * * * *